No. 753,926. PATENTED MAR. 8, 1904.
N. SMITH.
INSECT DESTROYER.
APPLICATION FILED JUNE 3, 1903.
NO MODEL.

Witnesses
Edwin G. McKee
Herbert D. Lawson

Inventor
Needham Smith

By Victor J. Evans
Attorney

No. 753,926.

Patented March 8, 1904.

UNITED STATES PATENT OFFICE.

NEEDHAM SMITH, OF PEARSALL, TEXAS.

INSECT-DESTROYER.

SPECIFICATION forming part of Letters Patent No. 753,926, dated March 8, 1904.

Application filed June 3, 1903. Serial No. 159,933. (No model.)

*To all whom it may concern:*

Be it known that I, NEEDHAM SMITH, a citizen of the United States, residing at Pearsall, in the county of Frio and State of Texas, have invented new and useful Improvements in Insect-Destroyers, of which the following is a specification.

My invention relates to new and useful improvements in insect-destroyers; and its object is to provide a simple and inexpensive attachment which may be readily secured to a wagon or other vehicle and which is provided with burners which are adjustably mounted in such a manner as to permit them to be drawn between rows of cotton or other plants, whereby all insects and vegetable growths between said rows may be destroyed.

The invention consists in providing a tank having a bracket whereby the same may be readily suspended from the body of a vehicle, and a pump is connected to this tank for the purpose of compressing air therein. An outlet-pipe extends from the tank and is connected to a laterally-projecting distributing-pipe, within the ends of which are adjustably secured depending pipes having burners at their lower ends.

The invention also consists in the further novel construction and combination of parts, hereinafter more fully described and claimed, and illustrated in the accompanying drawings, showing the preferred form of my invention, and in which—

Figure 1:
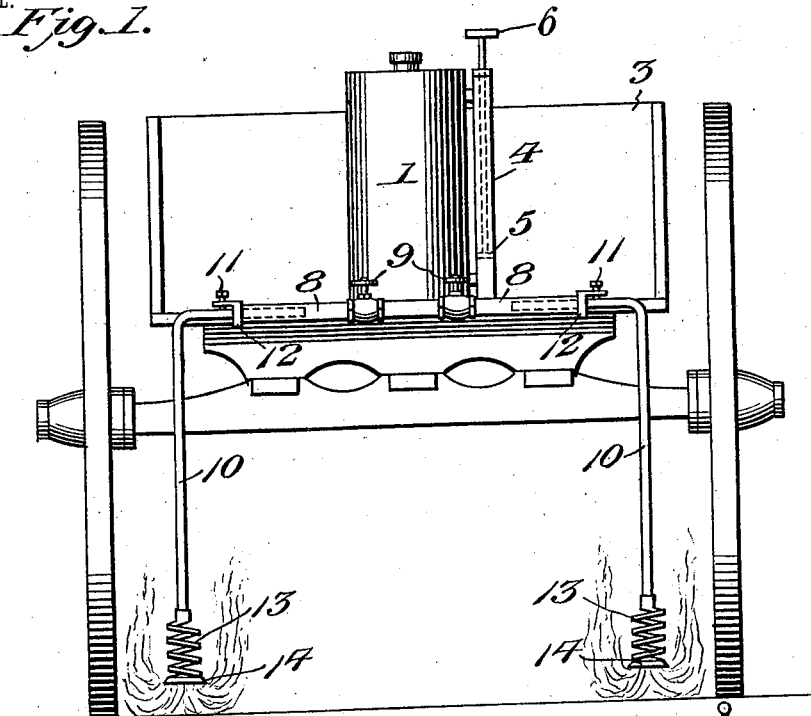
Figure 2:
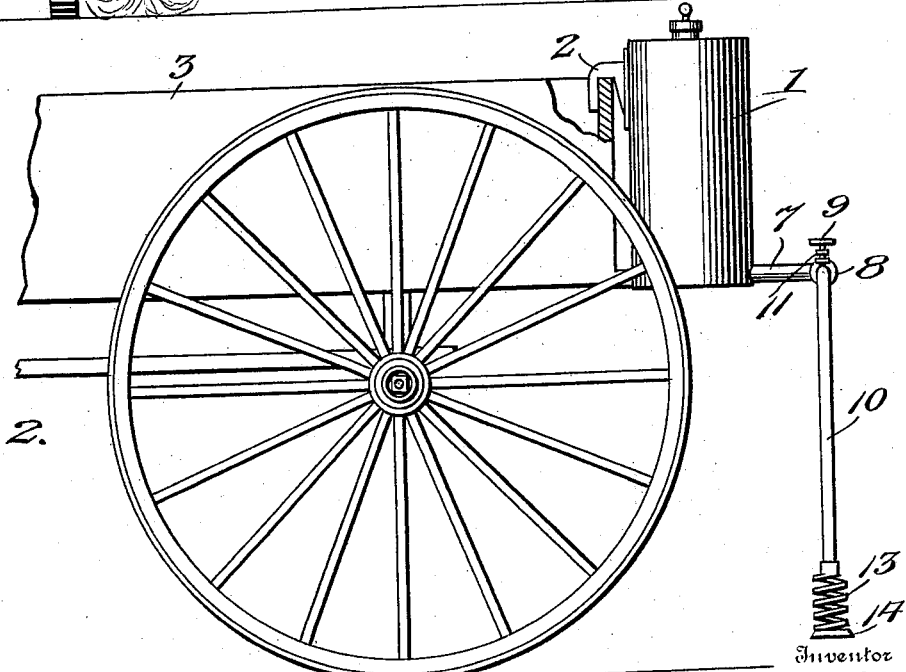

Figure 1 is a rear elevation of my improved attachment, the same being shown in position upon a vehicle; and Fig. 2 is a side elevation thereof.

Referring to the figures by numerals of reference, 1 is a tank of any suitable form having a bracket 2 secured thereto and adapted to engage the body of the vehicle 3, whereby said tank may be supported in position. A pump-cylinder 4 is arranged beside and communicates with the interior of the tank, and a reciprocating piston 5 is located within the cylinder and is adapted to be operated by a suitable handle 6. An outlet-pipe extends from the bottom of tank 1 and opens into a laterally-extending distributing-pipe 8, a valve 9 being preferably arranged within said pipe at opposite sides of the discharge-pipe 7. An L-shaped pipe 10 is adjustably mounted within each end of distributing-pipe 8 and is adapted to be locked in adjusted position therein by means of a set-screw 11, arranged within an overhanging bracket 12, secured to the pipe 8. To the lower end of each pipe 10 is arranged a coil 13, communicating with a burner 14 at the lower end thereof. This burner may be of any suitable form for directing flames downward upon the ground.

It is believed that the operation of the device may be readily understood from the foregoing description. By reciprocating the piston 5 within its cylinder 4 air will be forced into the tank 1 and will be compressed therein. This air will press downward upon the oil contained within the tank and will tend to force the same outward through the discharge-pipe 7, distributing-pipe 8, and the depending pipes 10. The oil is ignited at the burner 14. It will be understood that the pipes 10 can be adjusted from or toward each other, so as to be brought into position between the rows of plants.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention what is claimed as new is—

1. A device of the character described, comprising a tank, a supporting-bracket thereon, air-compressing means connected to the tank, a discharge-pipe, a laterally-extending distributing-pipe communicating with the discharge-pipe, valves therein, brackets upon the distributing-pipe, an L-shaped pipe adjustably mounted in each end of the distributing-pipe, means within the brackets of the distributing-pipe for locking the L-shaped pipes in adjusted position, and a burner upon each of said L-shaped pipes.

2. An attachment of the character described comprising a tank, a supporting-bracket extending therefrom and adapted to engage the body of a vehicle, air-compressing means connected to the tank, a discharge-pipe extending from the center of the tank, a valved distributing-pipe extending laterally from the discharge-pipe, brackets upon the distributing-pipe, an L-shaped pipe adjustably mounted in each end of the distributing-pipe, locking means within each bracket adapted to secure the L-shaped pipes in adjusted position, and burners upon said L-shaped pipes.

In testimony whereof I affix my signature in presence of two witnesses.

NEEDHAM SMITH.

Witnesses:
T. A. SANDERS,
GEO. M. ATKINSON.